(12) United States Patent
Nishizawa

(10) Patent No.: US 6,618,041 B2
(45) Date of Patent: Sep. 9, 2003

(54) INPUT DEVICE FOR INJECTION MOLDING MACHINE

(75) Inventor: Chiharu Nishizawa, Nagano-ken (JP)

(73) Assignee: Nissei Plastic Industrial Co., Ltd., Nagano-ken (JP)

(*) Notice: Subject to any disclaimer, the term of this patent is extended or adjusted under 35 U.S.C. 154(b) by 0 days.

(21) Appl. No.: 09/837,782

(22) Filed: Apr. 18, 2001

(65) Prior Publication Data
US 2001/0024196 A1 Sep. 27, 2001

(30) Foreign Application Priority Data
May 10, 2000 (JP) ........................................ 2000-137673

(51) Int. Cl.⁷ ................................................. G09G 5/00
(52) U.S. Cl. .......................... 345/173; 264/40.1; 700/204
(58) Field of Search ................................. 345/173, 174, 345/175, 176, 177, 156, 157; 178/18.1; 700/204, 83; 264/40.1, 40.7

(56) References Cited

U.S. PATENT DOCUMENTS

| 4,386,347 A | * | 5/1983 | Cutler et al. ................ 345/173 |
| 4,952,918 A | * | 8/1990 | Fujita et al. ................ 345/173 |
| 5,365,254 A | * | 11/1994 | Kawamoto ................... 345/157 |
| 6,015,515 A | * | 1/2000 | Fujita ........................ 264/40.1 |
| 6,073,059 A | * | 6/2000 | Hayashi et al. .............. 700/204 |

FOREIGN PATENT DOCUMENTS

JP          60247524          12/1985

* cited by examiner

Primary Examiner—Xiao Wu
(74) Attorney, Agent, or Firm—Merchant & Gould

(57) ABSTRACT

The present invention provides an input device for an injection molding machine, having a touch panel-type display screen. The display screen has set value displays for displaying set values of molding conditions. The set value display consists of a plurality of set value windows. Touching one of the set value windows makes an input element for inputting a set value of the molding conditions be displayed on the display screen. The input element constitutes a scale. Touching the scale changes numeric values displayed in the set value windows.

2 Claims, 6 Drawing Sheets

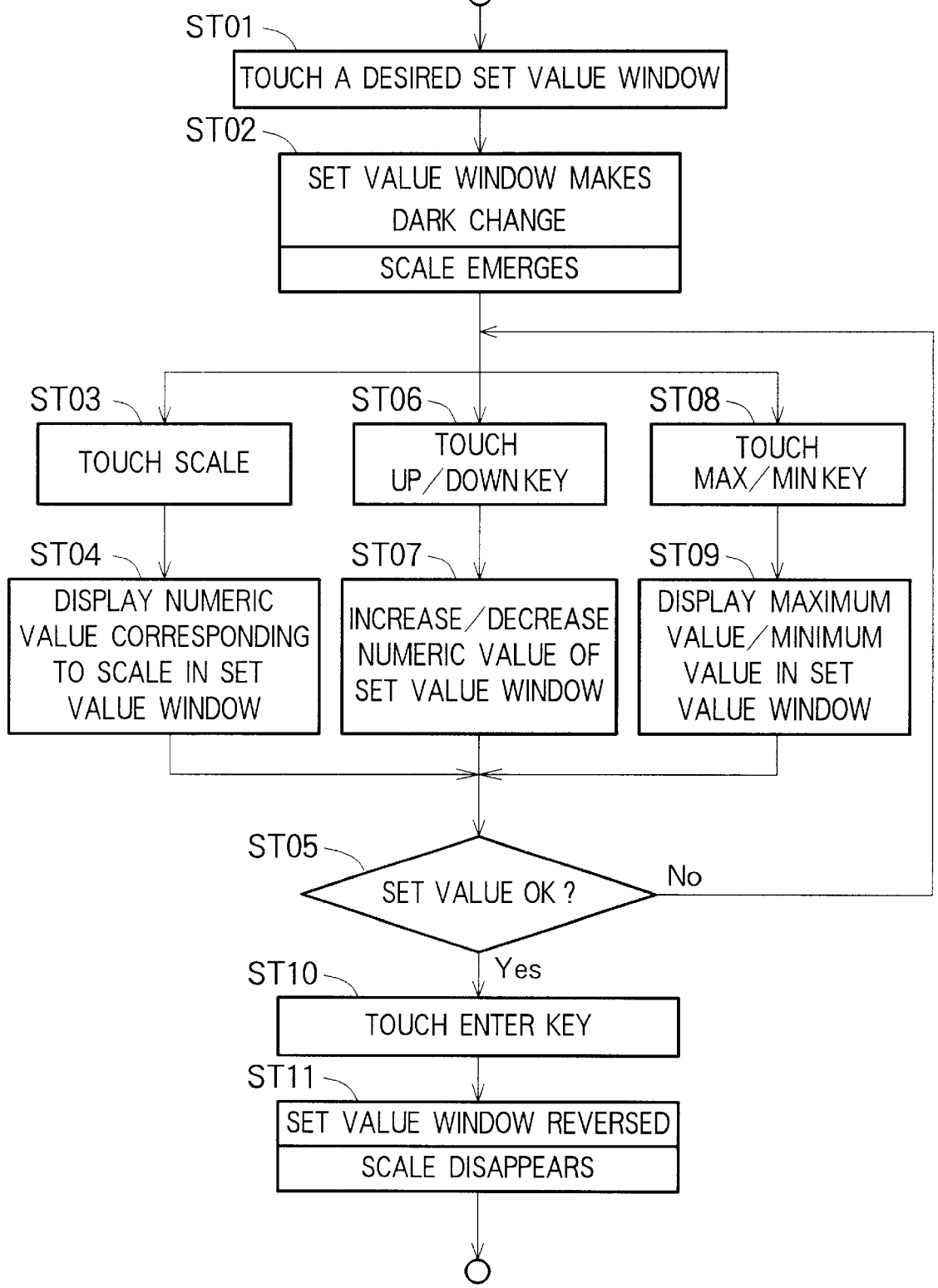

INPUT DEVICE FOR INJECTION MOLDING MACHINE

BACKGROUND OF THE INVENTION

1. Field of the Invention

This invention relates to an improved touch panel input device attached to injection molding machines.

2. Description of the Related Art

In an operation for injection molding resin, temperature conditions such as heating barrel temperature and mold temperature, pressure conditions such as injection pressure and screw back pressure, time conditions such as injection time and dwell time, and speed conditions such as injection speed and screw rotation speed are decisive factors for the quality of molded articles. Such conditions are collectively called "molding conditions." The molding conditions should be inputted in advance in a molding condition setting unit attached to an injection molding machine. An invention directed to such a molding condition setting unit is known from, for example, Japanese Patent Publication No. HEI-1-21779 entitled "Molding Condition Setting Unit."

The known molding condition setting unit includes a molding condition setting panel which is provided with a numeric keypad as well as various kinds of keys. The numeric keypad is used to key in set values comprising numeric values of the molding conditions. The numeric keypad, however, can cause such problem as the numeric value "10.5" being wrongly inputted as "105" with an inadvertent omission of the decimal "." The numeric keypad is a convenience on the one hand; however, it is likely to cause input error on the other hand. The numeric keypad occupies relatively large space on the molding condition setting panel. This may prevent making the molding condition setting panel compact when necessary.

In recent years, a display style has prevailed where the numeric keypad is laid over another screen on a display. In this style, part of the screen behind the relatively large numeric keypad cannot be seen. Therefore, it is necessary to move the numeric keypad to another place on the display, resulting in troublesome display manipulation. This may lengthen the operation time to set molding conditions, leading to the deterioration of productivity.

SUMMARY OF THE INVENTION

It is therefore an object of the present invention to provide an input device substituting for a numeric keypad, for use in molding condition setting units.

According to an aspect of the present invention, there is provided an input device for an injection molding machine, having a touch panel display screen, which input device comprises a set value display including a plurality of set value windows for displaying set values of molding conditions, and an input element including a scale for inputting the set values of the molding conditions, the input element being arranged to emerge with a touch of one of the set value windows, wherein touching the scale can change a numeric value displayed in the set value window.

Touching the set value window to be changed makes the scale emerge on the display screen. Touching the scale can change the numeric value in the set value window. The scale can be a sufficiently narrow band, which can be displayed on a position not to be an obstacle to the set value windows. In addition, while the conventional numeric keypad requires as many keystrokes as the number of digits of the numeric value, the scale allows the input of the numeric value with a single touch.

The input element has an up key and a down key on opposite sides of the scale, wherein pushing the up key or down key can further increase or decrease the numeric value changed by touching the scale. It is preferred to attach to the scale the up and down keys for adjusting numeric values. Inputting an approximate numeric value by touching the scale and then adjusting the numeric value with the up/down keys can shorten the total time of inputting operation of the numeric value.

BRIEF DESCRIPTION OF THE DRAWINGS

A preferred embodiment of the present invention will be described in more detail below, by way of example only, with reference to the accompanying drawings, in which:

FIG. 7 is a flowchart illustrating an operation of the input device according to the present invention.

DETAILED DESCRIPTION OF THE PREFERRED EMBODIMENT

The following description is merely exemplary in nature and is in no way intended to limit the invention, its application or uses.

Figure 1:
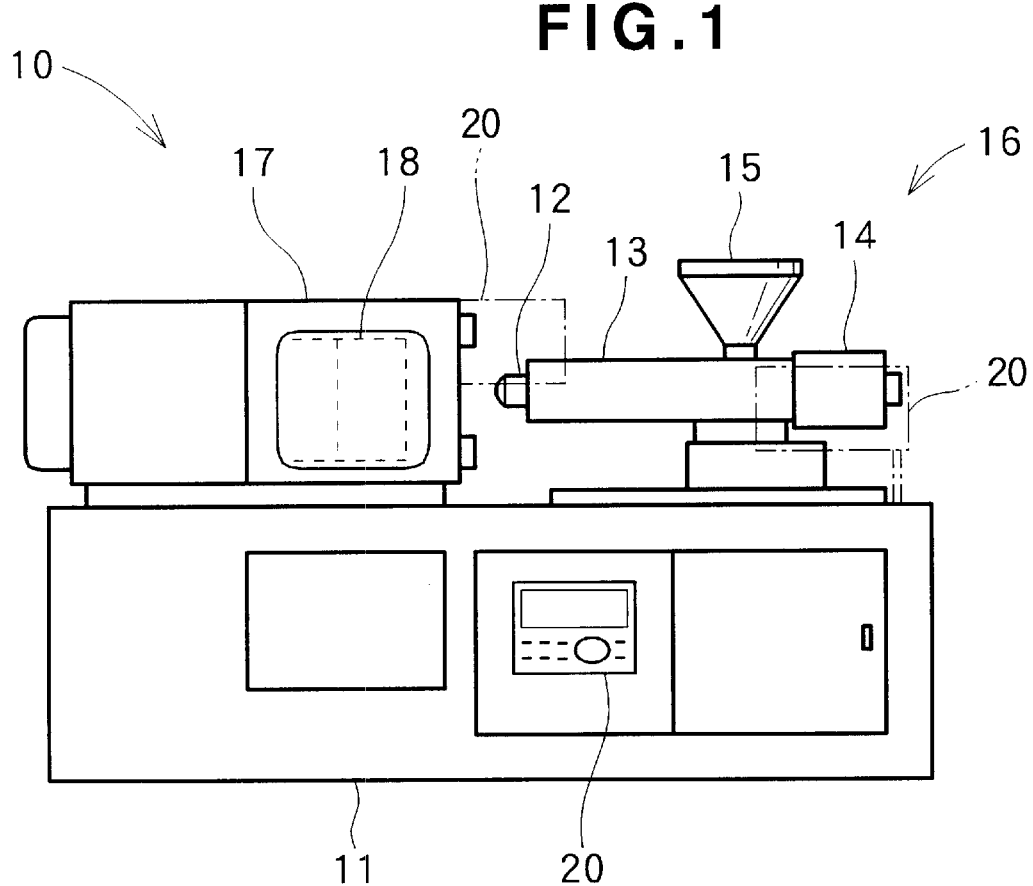
FIG. 1 is a front view of an injection molding machine equipped with an input device according to the present invention.

Referring to FIG. 1, an injection molding machine 10 comprises a base member 11, an injection apparatus 16 and a clamping apparatus supported on the base member. The injection apparatus 16 comprises a nozzle 12, a heating barrel 13, a screw driving unit 14 and a hopper 15. The clamping apparatus includes a mold 18 mounted thereto and is enclosed by a safety cover 17. The base member 11 includes a hydraulic unit. An input device 20 is disposed on a front surface of the base member or a side of the safe cover 17, or an upper position of the base member. The input device 20 can be set at any place in view of the work posture of an operator.

Figure 2:
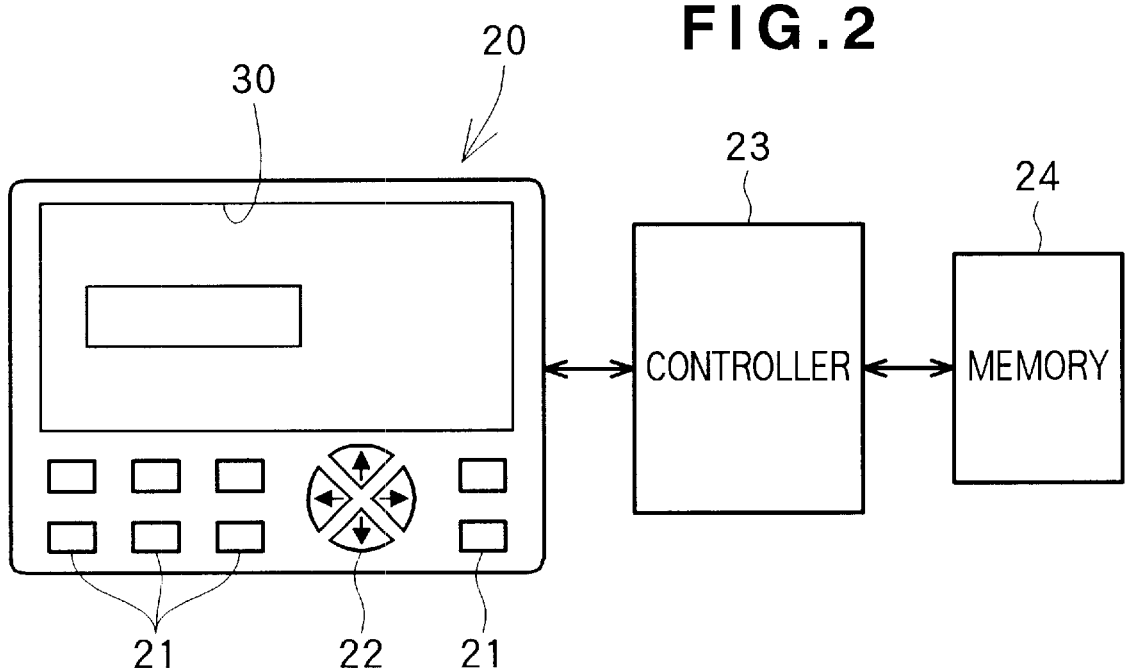
FIG. 2 is a schematic diagram of the input device shown in FIG. 1.

As shown in FIG. 2, the input device 20 is basically a touch panel input device, having various kinds of keys 21, a direction key 22 and a display screen 30 which are controlled by a controller 23. A memory 24 stores values inputted by touching operation or inputted in advance.

Figure 3:
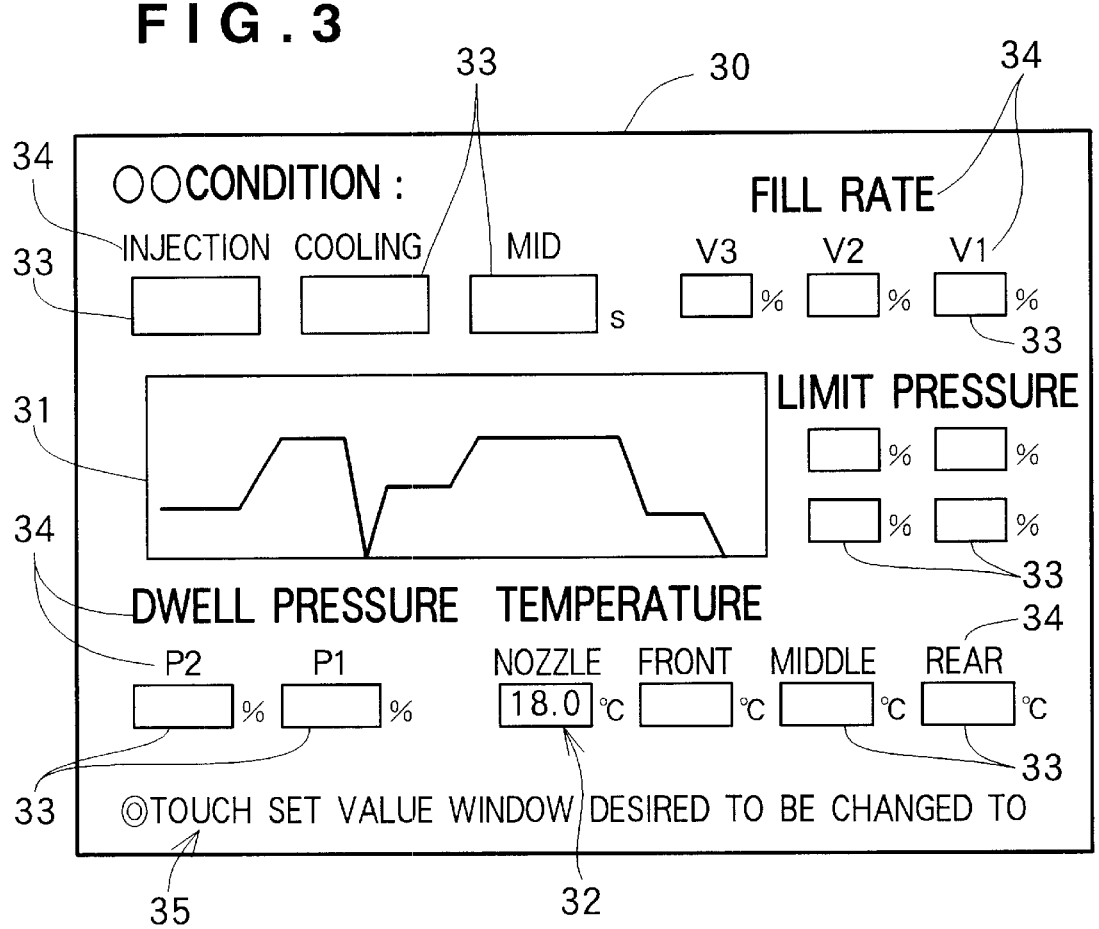
FIG. 3 is a diagram showing an initial display screen of the input device shown in FIG. 2.

As shown in FIG. 3, the display screen 30 on which displayed are a graph display 31, set value windows 32 and 33 enclosed in rectangles, labels 34 attached to the set value windows 32 and 33, and a message 35.

The set value windows 32 and 33 indicate numerical values of the molding conditions ("temperatures" such as heating barrel temperatures and mold temperature, "pressures" such as injection pressure and screw back pressure, "times" such as injection time and dwell time, "speeds" such as injection speed an screw rotation speed, "positions" of the screw and the nozzle, the volume of production, the number of cavities, the number of stages of multistage control, and other conditions). Here the set value window 32 of the nozzle temperature indicates "18.0"° C. Numeric values off the other set value windows 33 are omitted.

Suppose that the operator touches the set value window 32 of the nozzle temperature in accordance with the message.

Figure 4:
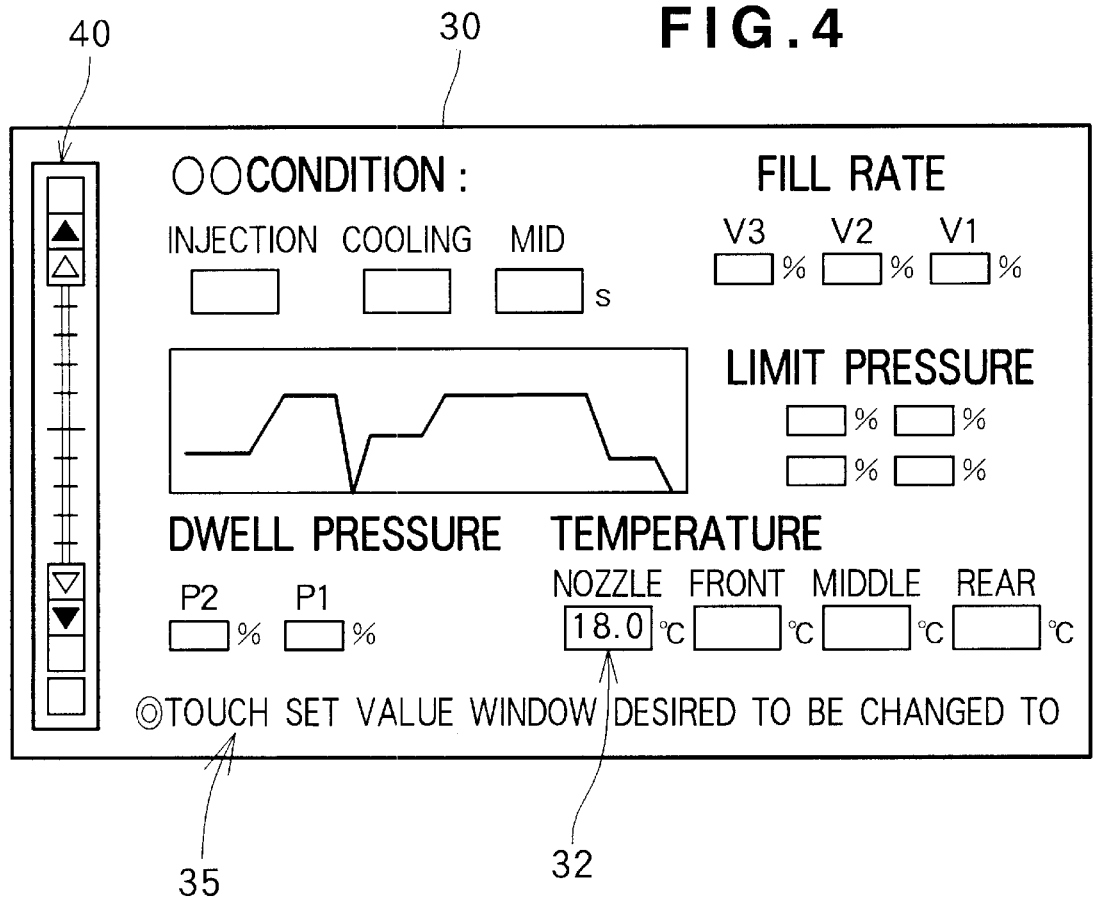
FIG. 4 is a diagram showing a display screen with a scale for inputting numeric values displayed thereon at a touch of a set value window shown in FIG. 3.

FIG. 4 is a functional diagram of the display screen according to the present invention. Touching the set value window 32 of the nozzle temperature inverts the window 32 to white-on-black to show that the set value window 32 is to be changed. At the same time, a scale 40 emerges as an input element on a left part. The message 35 is changed to "Touch Upper-Left Scale."

Figure 5:
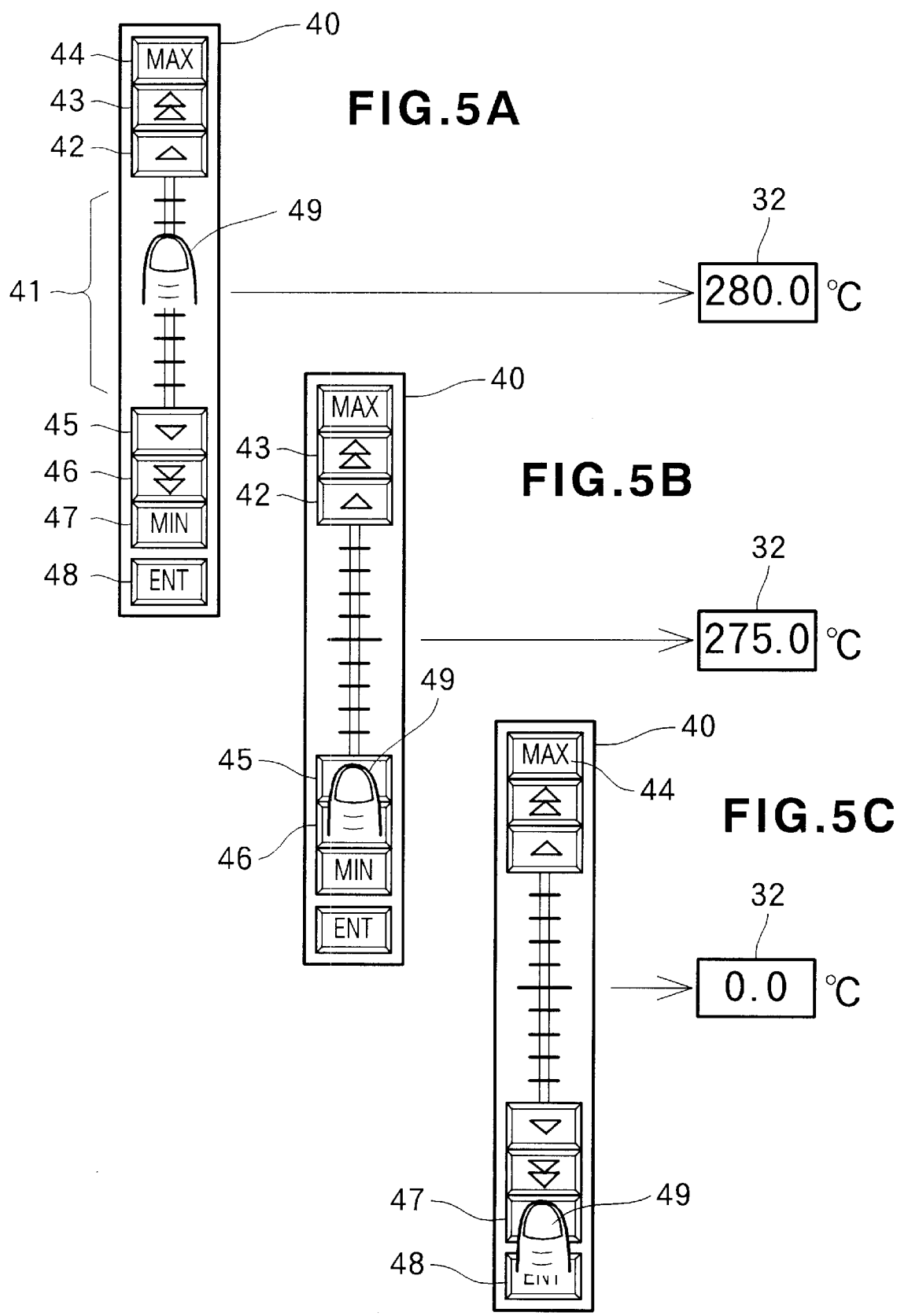
FIGS. 5A to 5C are schematic views illustrating an operation of the scale as an input element shown in FIG. 4.

FIGS. 5A to 5C are diagrams illustrating an input element according to the present invention. The scale 40 as an input element has a linear scale 41 as a base, to the upper end of which linear scale 41, an up key 42, a quick up key 43 and a max key 44 are attached in this order, to the lower end of which linear scale 41, a down key 45, a quick down key 46, a minimum key 47 and an enter key 48 are attached in this order.

In FIG. 5A, the linear scale 41 has ten notches (not shown correctly in the figure). The uppermost notch is assigned a maximum value (maximum value allowed in the set value window 32) and the lowermost notch is assigned a minimum value. Here suppose that the minimum value of the setting range of the set value window 32 is 0 and the maxim value is 400. A finger 49 touching a 70% point changes the set value window 32 to a temperature of 280.0° C. corresponding to the 70% point. The finger 49 touching different points changes the numeric value of the set value window 32 shown on the right of the scale 40 accordingly.

Herein noted is that, with the numeric keypad, the keys "2", "8", "0", ".", and "0" or "2", "8" and "0" should be pressed. In the present invention, only one operation of touching the linear scale 41 inputs 280.0.

In FIG. 5B, for example, touching the down key 45 allows decreasing a numeric value by degrees. Here, 280.0 is changed to 275.0. Touching the quick down key 46 permits quick decreasing of a numeric value.

Further in FIG. 5C, for example, touching the minimum key 47 allows the change to the minimum value of 0.0 at an instance.

The numeric value of the set value window 32 is changed in the above-described manner. When setting after change is OK, the operator touches the enter key 48 to fix the numeric value.

Figure 6:
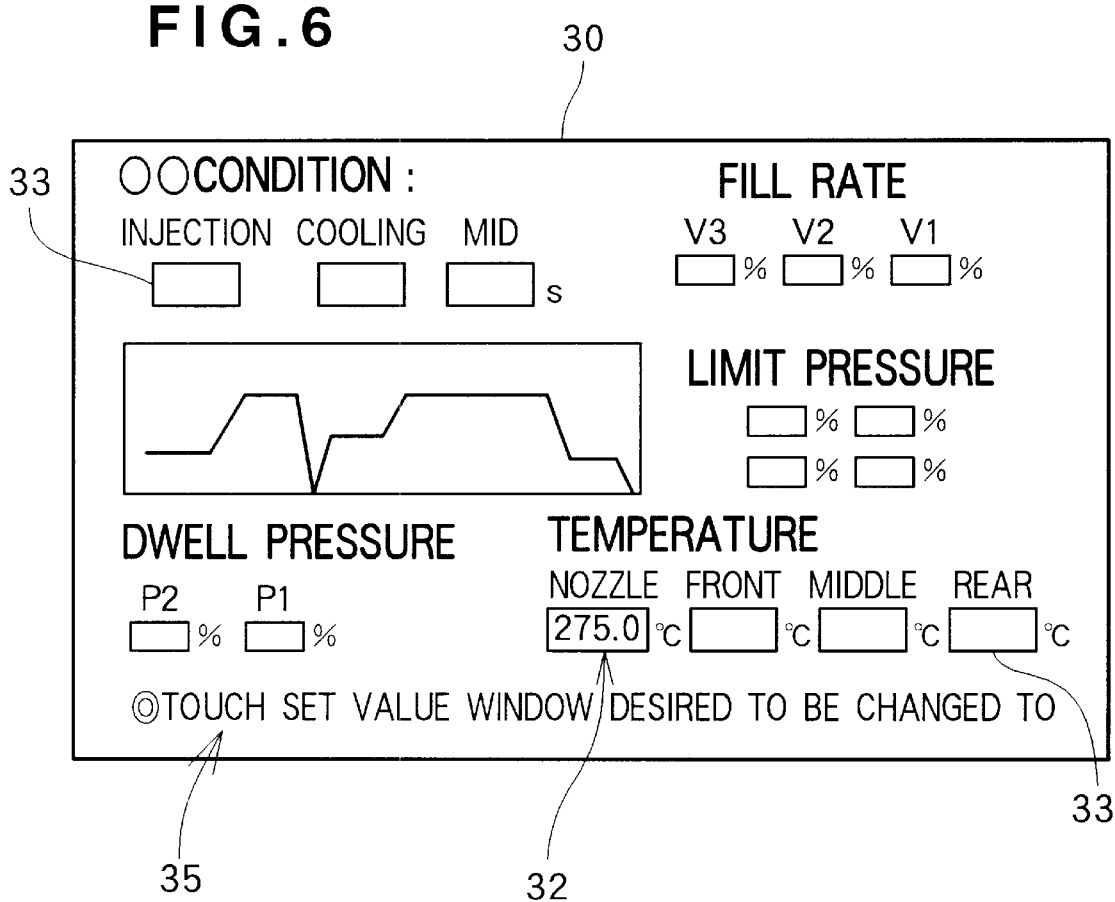
FIG. 6 is a diagram showing the display screen after the change of a numeric value.

FIG. 6 is a diagram showing the display screen after the change of the numeric value. Upon touching the enter key 48 at the point as shown in FIG. 5B, the scale 40 (See FIG. 4) disappears, the inverted set value window 32 of the nozzle temperature changed to 275.0 is returned to black-on-white, and the message 35 is returned to the original text. In short, except for the change of the numeric value of the set value window 32 of the nozzle temperature, all are returned to the state as shown in FIG. 3.

Now the above-described operation will be described again with reference to a flowchart.

FIG. 7 is an operational flowchart of the input device according to the present invention. ST denotes step numbers.

ST01: Touch a set value window to be changed in its numeric value.

ST02: The set value window touched is inverted to white-on-black, and the scale emerges (See FIG. 4).

ST03: Touch the scale (See FIG. 5A).

ST04: The numeric value of the set value window is changed to a numeric value corresponding to a touched point of the scale (See FIG. 5A).

ST05: Proceed to ST10 when the set value is OK. Return to ST03, ST06 or ST08 when the set value is not OK. ST06: When necessary, operate the up key or down key, and further the quick up key or quick down key (See FIG. 5B).

ST07: Through ST06, the numeric value of the set value window is either increased or decreased (See FIG. 5B).

ST08: When necessary, touch the max key or minimum key (See FIG. 5C).

ST09: Through ST08, the numeric value of the set value window is changed to a maximum or minimum value (See FIG. 5C).

ST10: When Yes in ST 05, that is, there is no need to correct the set value after the change, touch the enter key.

ST11: The set value window is returned to the original state, and the scale on the display disappears (See FIG. 6).

Although the scale emerges on a left part of the display in the embodiment, it can emerge on a right, upper or lower part. The main point is that the scale of a much smaller width than the conventional numeric keypad is displayed on an edge of the screen, thereby preventing the set value windows or other things from getting behind the scale. Accordingly, there is no problem in changing the position of the scale in every display screen unless the scale at a changed position becomes an obstacle to the screen. The scale can be positioned anywhere on the display.

However, positioning the scale on an upper, lower, right, or left part allows easy display designing, and it is preferred to make the scale always emerge at a fixed position on the display.

Although a set value window to be changed is inverted to white-on-black in the embodiment, it can be highlighted or made to flash (flicker).

Further, the form of the scale can be changed for usability.

Obviously, various minor changes and modifications of the present invention are possible in the light of the above teaching. It is therefore to be understood that within the scope of the appended claims, the invention may be practiced otherwise than as specifically described.

What is claimed is:

1. An input device for an injection molding machine, having a touch panel display screen, said input device comprising:

a set value display including plurality offset value windows displayed at all times on the touch panel display screen for displaying set values of molding conditions; and an input element comprising a scale for inputting the set values of the molding conditions, said scale being not normally displayed on the touch panel display screen but displayed only when a touch of one of said set value windows occurs;

wherein, touching said scale can change a numeric vain displayed in said one set value window.

2. An input device as set forth in claim 1, wherein:

said input element has an up key and a down key on opposite sides of said scale; and pushing said up key or down key can further increase or decrease the numeric value changed by touching the scale.

* * * * *